April 17, 1951
E. JAEGER
2,548,977
CABLE SHEATH SLITTER
Filed July 28, 1949
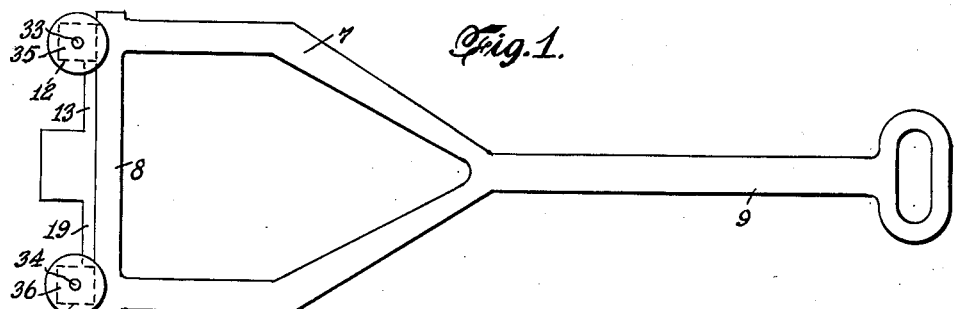
Fig.1.
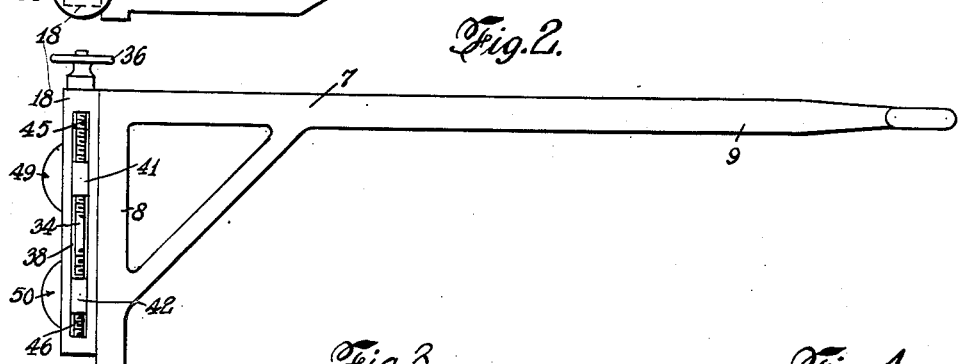
Fig.2.
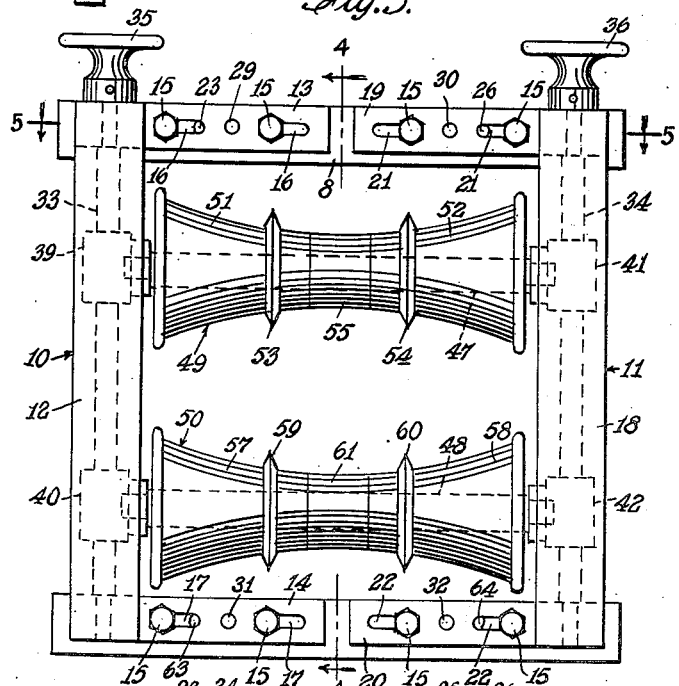
Fig.3.
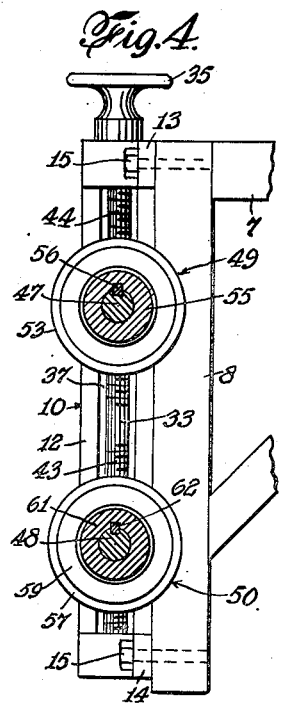
Fig.4.
Fig.5.
INVENTOR.
EUGEN JAEGER
BY
*[signature]*
ATTORNEY.

Patented Apr. 17, 1951

2,548,977

UNITED STATES PATENT OFFICE 2,548,977

CABLE SHEATH SLITTER

Eugen Jaeger, Kingston, Pa.

Application July 28, 1949, Serial No. 107,241

1 Claim. (Cl. 30—91)

This invention relates to cable cutters and the like, and more particularly to adjustable cutters for the leaden mantles of cables preventing damage to the cable wires and injury to workmen cutting the cables.

The main object of my invention is to provide a cable cutter which may be adjusted to suit different thicknesses of cable and also to allow replacement of the cutting rollers or sections thereof.

Another object is to have such a cable cutter which is provided with special adjustable brackets upon a firm frame to allow adjustments and shifting of the brackets and subsequent restoration thereof to original positions for use.

It is also an object to make such a cable cutter which will have a wider scope of utility and application than an ordinary cutter not equipped with adjustable features.

It is likewise an object to provide a cable cutter which is reliable and accurate in every condition of adjustment for cutting with equal facility and accuracy cables of various sizes and thicknesses.

Other objects and advantages of the invention will appear more fully in detail as the specification proceeds.

In order to bring out comprehensively the features of the present invention, the latter is illustrated on the accompanying drawing forming part hereof, and in which;

Figure 1 is a plan view of a cable cutter or cutting device embodying the invention in a practical form;

Figure 2 is a side elevation of the same device;

Figure 3 is a rear end view of the same cable cutter;

Figure 4 is a vertical section taken on line 4—4 in Figure 3;

Figure 5 is a transverse section taken on line 5—5 in Figure 3.

Throughout the views, the same reference numerals indicate the same or like parts.

Cable cutters are ordinarily made for a single size and thickness of cable, although certain variations of the latter may be handled, but as cables are of several quite different sizes and thicknesses, and accurate cutting thereof without damaging the interior wires or causing any injury to workmen using the cutters requires special equipment beyond the range of any single ordinary cutter. However, I have found it perfectly feasible to make a special cable cutter which is not limited to cutting one size and thickness of cable, but may be adjusted and altered for many sizes and thicknesses of cable, and yet be as satisfactory for each size and thickness of cable handled, as will now be fully described.

Hence, in the practice of my invention, and referring again to the accompanying drawing, a cable cutter primarily includes a frame 7 having a rear wall structure 8 and a handle 9. Upon the rear wall structure 8 are mounted two U-shaped brackets generally indicated at 10, 11. Bracket 10 consists of a massive bearing member 12 having two end limbs 13, 14 secured to said structure 8 by screws 15, 15, etc., extending through elongated slots 16, 16, 17, 17. In similar fashion, the other bracket 11 consists of the massive bearing member 18 having the two end limbs 19, 20 also secured to the other side of end wall structure 8 by screws 15, 15, etc., extending through elongated slots 21, 21, 22, 22. In order to definitely locate the bearing members 12 and 18, and especially to relocate them in original positions after they have been adjusted to different positions on rear wall structure 8, and also to determine at least two different positions for each bearing member, the latter wall structure has spaced pin holes 23, 24, 25 and 26 for two pins 27, 28 passing through single holes 29 and 30 in limbs 13 and 19 and in similar fashion the lower portion of structure 8 has two holes at each side (not shown) corresponding to holes 23, 24 and 25, 26 to register selectively with pin holes 31 and 32 in lower limbs 14 and 20, pins similar to 27 and 28 being used in these lower holes in the same manner as in the upper holes 29 and 30.

Extending throughout the length of both bearing members 12 and 18 are a pair of adjusting feed screws 33 and 34 provided with manual adjusting knobs 35 and 36 for rotating them. In vertical slots 37, 38 in these bearing members are spaced pairs of bearings 39, 40 and 41, 42 through which the feed screws extend. Feed screw 33 has a lower right hand thread 43 and an upper left hand thread 44, while feed screw 34 has upper left hand thread 45 and lower right hand thread 46, so that turning these feed screws by means of knobs 35 and 36 will cause the bearings 39 and 41 to approach toward or recede from bearings 40 and 42, respectively. The mentioned bearings serve to rotatably support the ends of two parallel shafts 47 and 48, bearings 39 and 41 supporting shaft 47, and bearings 40 and 42 supporting shaft 48. Upon these shafts are mounted rollers generally indicated at 49 and 50, each roller being built up of several roller members. For example, roller 49 consists of two roller members 51 and 52 with cutters 53 and 54 upon their inner ends spaced apart by interchangeable intermediate sections 55 all held on shaft by a key 56 extending into the shaft. In similar manner, the other roller 50 consists of roller members 57 and 58 with cutters 59 and 60 spaced apart by interchangeable intermediate section 61, these parts being fast on the shaft with a key 62 extending into this shaft 48.

When the rollers are to be removed or replaced by different rollers or are intended to have different intermediate sections introduced instead of sections 55 and 61, releasing screws 15 of limbs 19 and 20 will allow the pins to be withdrawn from holes 30 and 32 and the inner hole 25 in the upper and lower portions of wall 8, and the bearing member 18 then slid toward the right as far as slots 21 and 22 will allow upon the screws 15, 15 which still remain in place but are loose. In the extreme outer position thus attained, the slots at the left ends of limbs 19 and 20 are intended to register with inner pin holes 25, whereas normally, the outer slots 16 and 21 of upper limbs 13 and 19 register at one end of each with holes 23 and 26, while outer slots 17 and 22 of lower limbs 14 and 20 register at one end of each with pin holes 63 and 64 in wall 8.

In any event, such sliding of the bearing member 18 toward the right will so far remove the two bearings 41 and 42 to the right that they part from the right ends of both shafts 47 and 48 and allow these shafts with their rollers 49 and 50 to be lifted out for alteration as mentioned or replacement. When the rollers are to be restored, they are again placed in position, bearing member 18 slid back into place and pins 28 again set in place in holes 25, 30, 32, etc. and screws 15 made tight. Manipulating hand knobs 35 and 36 to equal extents will determine the depth of cut into the cable sheath in known manner, and the general operation of the device need therefore not be discussed in detail.

Of course, I am not limited to all the details shown and described, as they may be altered in form and proportion, and in fact, it is manifest that variations may be resorted to, and parts and features may be modified or used without others within the scope of the appended claim.

Having now fully described my invention, I claim:

In a cable cutting device, a supporting frame, a pair of horizontal parallel rollers, bearing members in which the ends of the rollers are journaled, a pair of vertical adjusting shafts carried upon the frame having right and left threads formed thereon engaging said bearing members, means for manually rotating the shafts to adjust the distance between the parallel rollers, a pair of circular knives carried by each roller and means for changing the distance between the bearing members to accommodate rollers of different lengths including gauge pins and bolting means said gauge pins being adapted to engage spaced apart pin holes positioned in the supporting frame.

EUGEN JAEGER.

REFERENCES CITED

The following references are of record in the file of this patent:

UNITED STATES PATENTS

| Number | Name | Date |
| --- | --- | --- |
| 1,793,085 | Grote | Feb. 17, 1931 |
| 1,798,683 | Korab | Mar. 31, 1931 |
| 2,333,437 | Olschewski | Nov. 2, 1943 |

FOREIGN PATENTS

| Number | Country | Date |
| --- | --- | --- |
| 677,499 | France | Mar. 11, 1930 |